United States Patent [19]

Padula et al.

[11] Patent Number: 4,786,764
[45] Date of Patent: Nov. 22, 1988

[54] DIGITIZER STYLUS WITH PRESSURE TRANSDUCER

[75] Inventors: Michael J. Padula, Sandy Hook; Henry G. Matthews, Haddam, both of Conn.

[73] Assignee: Summagraphics Corporation, Fairfield, Conn.

[21] Appl. No.: 28,494

[22] Filed: Mar. 20, 1987

[51] Int. Cl.$^4$ .............................................. G08C 21/00
[52] U.S. Cl. ........................................ 178/18; 178/19; 338/2
[58] Field of Search .............................. 178/18, 19, 87; 340/706; 338/67, 2, 6; 382/13, 59; 200/262, 265

[56] References Cited

U.S. PATENT DOCUMENTS

| | | | |
|---|---|---|---|
| 3,528,295 | 9/1970 | Johnson et al. | 382/59 |
| 4,311,980 | 1/1982 | Prudenziati | 338/2 |
| 4,492,819 | 1/1985 | Rodgers et al. | 178/18 |
| 4,532,376 | 7/1985 | Rockwell | 178/18 |

*Primary Examiner*—Stafford D. Schreyer
*Attorney, Agent, or Firm*—Rosen, Dainow & Jacobs

[57] ABSTRACT

A stylus switch is activated automatically when the tip of the stylus is pressed against a digitizer tablet with sufficient force. The pressure switch includes a transducer in the form of an ink layer having electrical resistance which varies as a function of the pressure applied thereon. Electrodes of conductive ink contact the ink layer of the transducer, providing a circuit element including a variable resistance. The current which flows between the two conductive ink electrodes varies as a function of the force with which the stylus tip is pressed against the data tablet, thus providing an analog output which can be detected as a function of pressure or which can be detected to determine when the pressing force exceeds a predetermined value. Processing of the data representing the coordinates of the stylus tip is enabled only when the tip is being pressed with at least a predetermined force, i.e. the amount of force applied by a stylus user during writing. The ink layers of the electrodes and transducer, as well as the stylus anode, are applied on a single piece of flexible plastic film which is wrapped around a central assembly and inside a coaxial barrel. A collapsible dome of metal is arranged to provide tactile feedback to the user when the predetermined force is obtained.

20 Claims, 6 Drawing Sheets

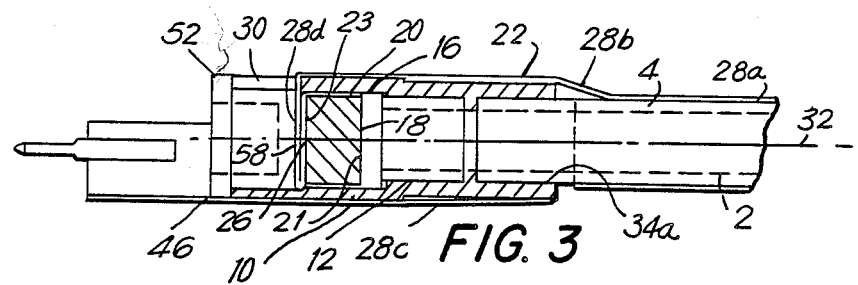
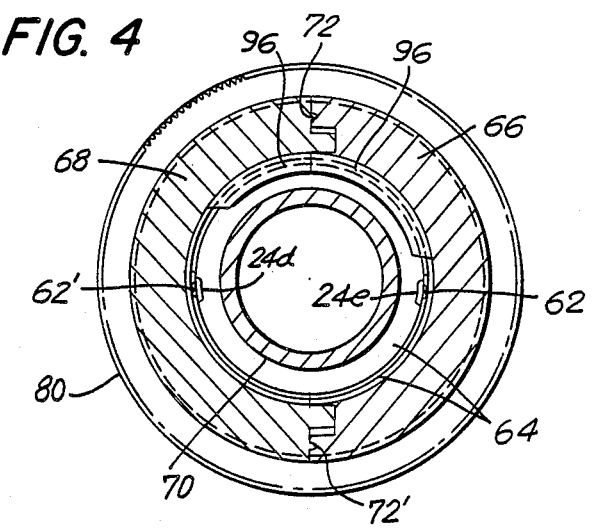

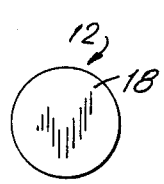 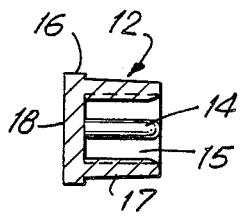 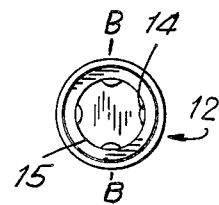
FIG. 5A　　　FIG. 5B　　　FIG. 5C
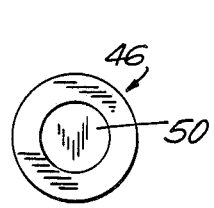 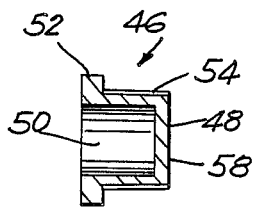 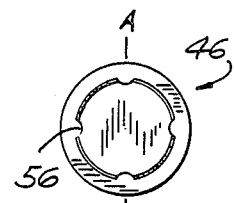
FIG. 6A　　　FIG. 6B　　　FIG. 6C
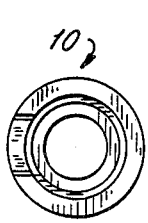 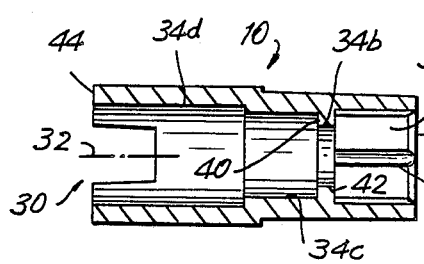 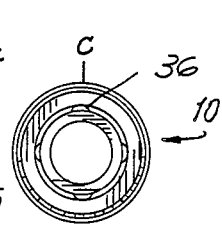
FIG. 7A　　　FIG. 7B　　　FIG. 7C

DIGITIZER STYLUS WITH PRESSURE TRANSDUCER

FIELD OF THE INVENTION

This invention relates generally to a pressure-sensitive stylus of the type used with a digitizer tablet. In particular, the invention relates to stylus having a layer of pressure-sensitive ink, the stylus being intended especially for use in a signature verification system or graphics digitizer tablet.

BACKGROUND OF THE INVENTION

In operation, electrical coupling is produced between the stylus and the digitizer tablet and position of the stylus on the digitizer surface is determined from the coupled signals. A combination of stylus and digitizer tablet is commonly referred to as a "digitizer". The earliest digitizers were mechanical devices with restrained arms. More advanced digitizers have free moving styluses and use various forms of coupling phenomenon between a stylus and a digitizing tablet to determine stylus position. Coupling has been based upon electromagnetic, electrostatic, sonic, piezoelectric, magnetostrictive, optical, etc. principles. The tablet surfaces have included crossed grids of wires, matrices of electrodes and resistive surfaces. Generally, these devices depend upon monitoring of signals introduced into a plurality of X and Y oriented conductors or into a resistive film.

Styluses are generally hand-held devices which press against the digitizer tablet surface with a point similar to that on a conventional ball-point pen. Within the stylus housing are mounted various circuit elements including electrodes for coupling to the digitizer tablet surface where capacitive coupling is used, electrical windings where an inductive coupling is used, etc., as is appropriate for the concept, as indicated above, upon which operation of the digitizer is based. Data from the stylus/tablet combination is input to electronic circuits which convert the signals into data representative of the coordinate position of the stylus on the tablet or into signals which in conjunction with a microprocessor are used to drive a display. The display can indicate either or both the numeric coordinates of the location of the stylus or a graphical representation indicating the stylus position by a displayed dot.

It is desirable for orderly operation of the apparatus and for elimination of spurious data inputs, that the entire system be operative only when the stylus is intentionally pressed against the digitizer tablet surface. For this reason, switching elements are generally included within the stylus housing to isolate the stylus from the data processing circuits or connect the stylus as required in operation. The switching elements are varied in construction and include simple electro-mechanical switches which are actuated by a small movement of the stylus point into the stylus housing when the point is pressed against the digitizer tablet surface.

In another construction, a core is moved within an induction coil when the stylus point is pressed against the digitizer tablet surface and the point recedes slightly within the stylus housing. This core movement changes the output from the induction coil and provides a signal to activate the stylus. Capacitive switching is also used wherein a capacitive plate is connected to the stylus and moves in relation to an opposing capacitor plate when the stylus is pressed against a digitizer tablet surface. This movement induces a signal which activates the system.

Switches operated directly by the stylus user are available in the form of switch buttons and switch handles located on the outside of the stylus housing.

However, a disadvantage in the prior art styluses is the added bulk, complexity, and cost of switches for initiating active use of the stylus as described above. What is needed is a stylus construction including reliable on/off switching or pressure function using small and economical components.

A further disadvantage of the prior art styluses is that substantial tip travel in the axial direction is required to activate the switch.

SUMMARY OF THE INVENTION

In accordance with the invention, a stylus switch of the type which is activated automatically when the stylus is pressed against a digitizer tablet is provided. The subject stylus pressure switch comprises a transducer in the form of an ink layer having electrical resistance which varies as a function of the pressure applied to the layer. Electrodes contact the ink layer transducer, providing a circuit including a variable resistance. Each electrode is formed as a layer of conductive ink.

When the switch is used in a stylus, a small segment of this layered construction is positioned such that in response to pressing of the stylus against a hard surface, as is used in a digitizer tablet, mechanical force is transmitted by a surface to compress the transducer. The resistance of the transducer layer varies with the application of pressure. Accordingly, current which flows between the two conductive ink electrodes varies as the pressure applied to the switch is varied, providing an analog output indicating pressure. Processing circuitry connected to the electrodes detects a threshold level of change in output as an indication of changed on/off conditions of the stylus and activates associated digitizer circuitry as is appropriate.

In other words, the data flow from the stylus is processed only when the pressure with which the stylus tip contacts the digitizer tablet is above a predetermined value. This predetermined value is selected to be less than the pressure produced when the stylus is used to write a signature, for example. Thus, the data flow will be processed during signature writing. Removal of the digitizer point from the tablet surface allows the stylus to return to a standby condition wherein no pressure is exerted on the ink layer.

The pressure transducer includes a layer formed of a force-sensitive resistant (FSR) transducer ink, for example, as manufactured by Interlink Electronics, Santa Barbara, Calif. Such material changes its resistance when compressed by the application of a force on the surface thereof. Electrically conductive electrodes contact separated portions of the surface of the FSR transducer ink layer such that a complete circuit is formed between the conductors by way of the FSR transducer ink layer.

The conductors are formed by a layer of conductive ink, for example, as manufactured by E. I. Dupont Corporation. The conductive ink electrodes and the ink layer transducer are printed on a thin Mylar layer which is folded together. The electrodes are pressed against the transducer to complete the electrical circuit.

It can be appreciated that when the digitizer apparatus is turned on but the stylus is not yet in use, a voltage can be provided across the FSR transducer by way of the stylus terminals and conductive electrodes. Then, when the tip of the stylus is pressed against a digitizer tablet surface, the FSR transducer ink layer is compressed between the surfaces of two opposing parts, one part being displaceable when pressure is exerted on the stylus tip and the other part being stationary. As the FSR transducer ink layer is compressed, the electrical resistance thereof changes such that a current and/or voltage change is produced at the output terminal. This change is used as a trigger to enable processing by the digitizer electronics of the acquired data. In the preferred embodiment, the coordinate determination data is acquired from the stylus, which is capacitively coupled to driven electrodes in the charge ratio tablet. However, it will be obvious to one of ordinary skill in the art that the coordinate determination data could be acquired from the electrodes of the charge ratio tablet in response to driving of the stylus.

In one preferred embodiment of the invention, the part which is displaceable against the FSR transducer when the pressure is applied to the stylus tip is resilient and substantially planar. The change in resistance of the transducer ink layer in this case is a function of pressure. In this way an analog signal is derived which is related to the force applied to the stylus tip. This analog signal can be used advantageously in mechanical or electrical drawing, where varying force indicates the use of or need for lines of varying thickness, for example, when digitizing a blueprint or circuit, in addition to the use already noted in connection with signature verification.

In another embodiment of the invention, the part which is displaceable against the transducer when the pressure is applied to the stylus tip is resilient and rounded, whereby the area of the part pressed against the transducer increases as the pressure increases. The change in resistance in this case is a function of both the pressure and the change in the surface area of contact between the displaceable part and the transducer.

Accordingly, an object of this invention is to provide an improved digitizer stylus which provides on/off switching in response to displacement of the stylus tip relative to the stylus housing during writing.

Another object of this invention is to provide an improved stylus switch which is reliable, small, and inexpensive to produce.

A further object of this invention is to provide an improved digitizer stylus which provides an analog output indicative of pressure exerted by the stylus tip against a digitizer tablet surface.

Another object of the invention is to provide tactile feedback to the user indicating when a pressure sufficient to activate the flow of data from the stylus has been applied.

Still other objects and advantages of the invention will in part be obvious and will in part be apparent from the specification.

BRIEF DESCRIPTION OF THE DRAWINGS

The preferred embodiments in accordance with the invention will be hereinafter described in detail with reference to the drawings, wherein:

FIG. 2 is a side view of the pen refill incorporated in the stylus of FIG. 1.

FIG. 3 is a partial longitudinal sectional view of the inner barrel assembly incorporated in the stylus of FIG. 1.

FIG. 4 is a cross-sectional view taken along section Z—Z of FIG. 1.

FIG. 5B is a longitudinal sectional view of the refill interface plug shown in FIG. 3, and FIGS. 5A and 5C are respective end views of the refill interface plug of FIG. 5B.

FIG. 6B is a longitudinal sectional view of the inner barrel plug shown in FIG. 3, and FIGS. 6A and 6C are respective end views of the inner barrel plug of FIG. 6B.

FIG. 7B is a longitudinal sectional view of the inner barrel shown in FIG. 3, and FIGS. 7A and 7C are respective end views of the inner barrel shown in FIG. 7B.

DETAILED DESCRIPTION OF THE PREFERRED EMBODIMENT

Figure 1:
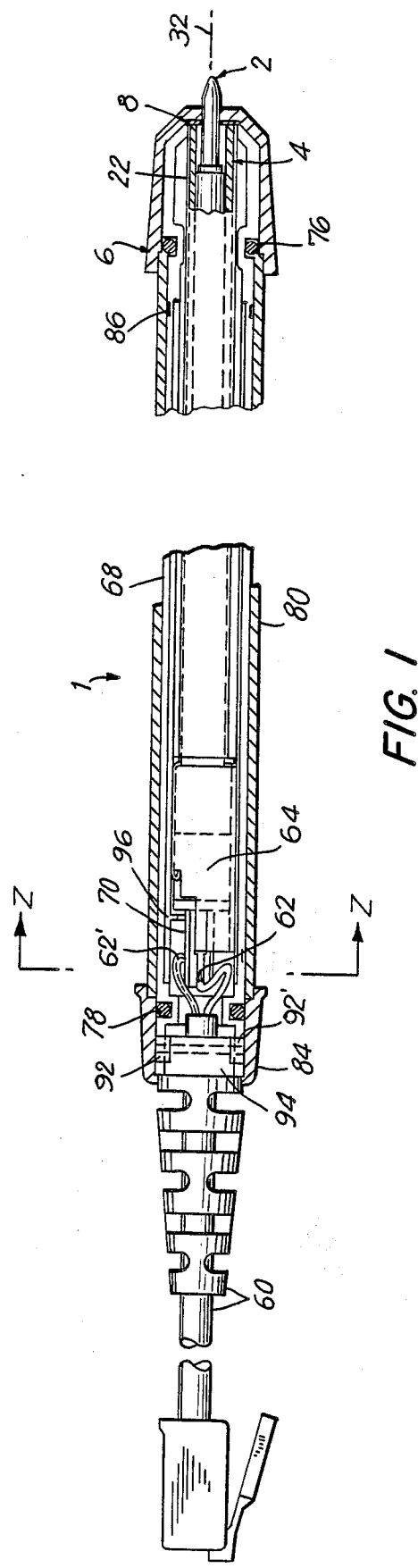
FIG. 1 is a partial longitudinal sectional view of the assembled stylus in accordance with a preferred embodiment.

The stylus 1 is shown in the partial sectional view of FIG. 1. A pen refill 2 is arranged in the bore of inner barrel extrusion 4. The pen refill 2 can be a standard pen refill, as shown in FIG. 2. The plastic cap 3, shown in phantom in FIG. 2, which comes with the refill, is removed prior to assembly of the stylus. In the preferred embodiment, the pen refill is made of stainless steel and is supplied by A. T. Cross Co., Lincoln, R.I. The inner barrel extrusion 4 is a cylindrical sleeve having a bore with a radius sufficiently large to enable easy insertion of the pen refill 2.

The tip of pen refill 2 extends through a hole in nose cap 6 with sufficient play to enable the refill to be axially displaced relative to the nose cap. The nose cap 6 is made of molded plastic. A rubber washer 8 is arranged between the nose cap 6 and one end of inner barrel extrusion 4 to prevent electrostatic discharge from the metal refill 2 to the flex board 22. The other end of inner barrel extrusion 4 is frictionally fit into inner barrel 10, as best seen in FIG. 3. Various views of inner barrel 10 are presented in FIGS. 7A–7C, and will be discussed in detail hereinafter.

The end of the refill 2 extends beyond the end of the inner barrel extrusion 4 and inside the inner barrel 10. This end of refill 2 is received by the refill interface plug 12 (see FIG. 3), which is arranged inside inner barrel 10. Refill interface plug 12 is frictionally fit onto this end of refill 2 by means of four circumferentially distributed ribs 14 extending axially in the bore 15 (see FIGS. 5B and 5C). The base 16 of refill interface plug 12 has a planar radial surface 18. A circular cylindrical plunger 20 (see FIG. 3) is arranged inside inner barrel 10, with a planar radial end face 21 abutting the planar radial surface 18 of refill interface plug 12.

The inner barrel 10 and the inner barrel extrusion 4 have a flex board 22 wrapped therearound. Flex board 22 is a flexible substrate having an electrical circuit 24a–24g and a circular layer of force-sensing resistant (FSR) ink forming the FSR transducer 26 applied thereon. The flex board 22 is shown in its unwrapped condition in FIG. 9. The electrical circuit includes anode 24a, and conductive connections 24b, 24c and 24h. The connection 24h electrically connects the terminal 24e and the electrode 24f. The connection 24c electrically connects the terminal 24d and the electrode 24g. The connection 24b electrically connects anode 24a to connection 24c. In the preferred embodiment, the electrical circuit and the FSR transducer are formed by the application of layers of conductive ink.

Figure 9:
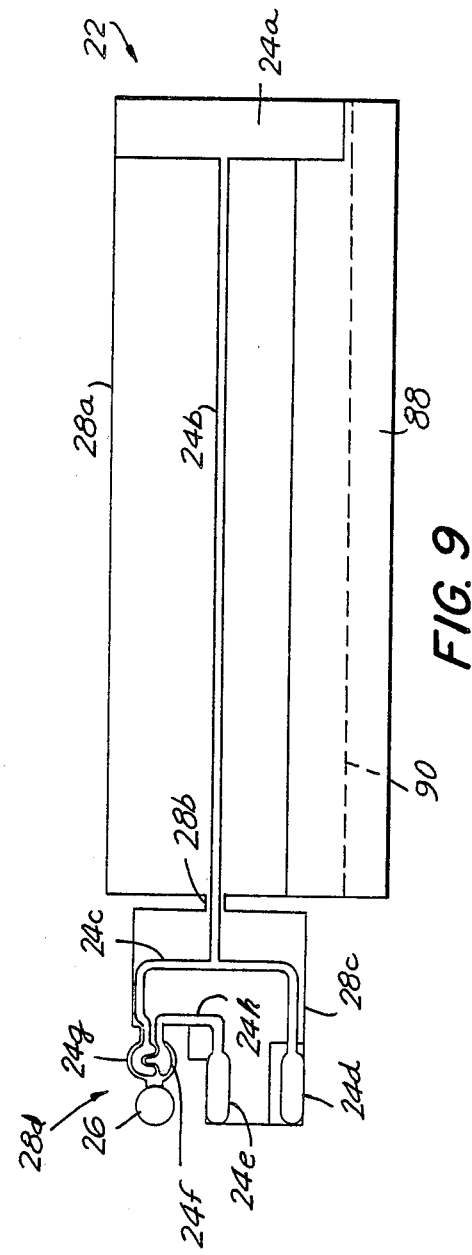
FIG. 9 is a view of the flex board of FIG. 8 in its unwrapped condition.

The flexible substrate takes the form of Mylar film. As can be seen in FIG. 9, the substrate has an asymmetrical configuration, including a rectangular portion 28a, a polygonal portion 28c, a bridge or neck portion 28b connecting the portions 28a and 28c, and a curvilinear portion 28d having a configuration formed by a pair of circular portions connected in series to portion 28b via respective neck or bridging portions.

Figure 8:
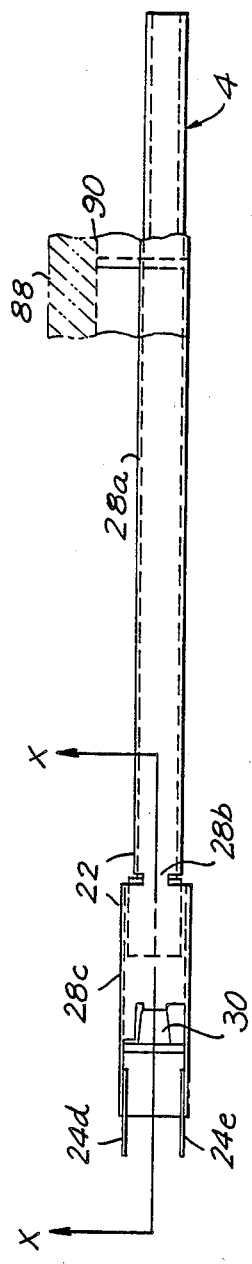
FIG. 8 is a side view of the wrapped flex board incorporated in the stylus of FIG. 1.

The portion 28a is wrapped around the inner barrel extrusion 4 and the portion 28c is wrapped around the inner barrel 10, as best seen in FIG. 8. The finger tab 88, by which flex board 22 is handled during wrapping, is ultimately removed by cutting along perforation 90 after the wrapping step has been completed. The portion 28d is folded twice during assembly of the stylus, as best seen in FIG. 3. The FSR transducer 26 is folded 180° so as to underlie and contact the electrodes 24f and 24g, which electrodes are in turn folded inwardly 90° relative to portion 28b. As best seen in FIG. 7B, the inner barrel 10 has a bore comprising the sections 34a–34d and has a recess 30 communicating with bore section 34d, through which folded FSR transducer 26 and electrodes 24f and 24g pass during the 90° folding. This brings the folded portions from a position substantially tangential to the outer periphery of inner barrel 10 to a position inside the inner barrel 10 and substantially transverse to the inner barrel axis 32. In this latter position, the FSR transducer 26 lies between the electrodes 24f, 24g and the opposing radial planar surface 23 of plunger 20.

As shown in FIG. 7B the inner barrel 10 has a series of communicating bore sections 34a–34d arranged along the longitudinal axis. Bore section 34a is a conical bore having axial ribs 36 circumferentially distributed thereon. The end of bore section 34a has a chamfer 38. Ribbed bore section 34a receives the end of the inner barrel extrusion 4, which is held in place in bore section 34a by friction fit. The endface of inner barrel extrusion 4 abuts against the annular shoulder 42 on one side of bore section 34b. On the other side of bore section 34b, another annular shoulder 40 is provided, against which refill interface plug 12 abuts (see FIG. 3). The sleeve portion 17 of refill interface plug 12 is seated in bore section 34c. The base 16 of refill interface plug 12 is seated in bore section 34d, along with plunger 20 and the sleeve portion 54 of inner barrel plug 46. The refill interface plug 12 and plunger 20 are axially slidably displaceable relative to inner barrel 10. The inner barrel plug 46 is glued inside the inner barrel 10 so as to be axially fixed. The shoulder of flange 52 of inner barrel plug 46 (see FIG. 6B) abuts against the end face 44 of inner barrel 10, which end face is annular except for the discontinuity corresponding to recess 30.

The plunger 20 in the preferred embodiment is in the form of a Neoprene slug. Plunger 20 is elastically compressed during the application of pressure on the stylus tip. When the pressure is removed from the stylus tip, the refill interface plug 12 and refill 2 are restored to their original position by the expansion of the elastic material of plunger 20.

The inner barrel plug 46 includes a flange 52, a sleeve portion 54, an axial bore 50 through flange 52, and a base 48 closing one end of bore 50 (see FIG. 6B). The outer circumferential surface of sleeve portion 54 is slightly conical and has axial grooves 56 circumferentially distributed thereon (see FIG. 6C). The base 48 has a planar end face 58 which is substantially transverse to axis 32 when inner barrel plug 46 is force-fit inside bore section 34d of inner barrel 10.

The FSR transducer 26 and electrodes 24f, 24g are pressed between opposing planar radial surfaces, i.e. end face 23 of plunger 20 and end face 58 of inner barrel plug 46, when the tip of the stylus is pressed against a surface. As is obvious, the pressure exerted on FSR transducer 26 by these opposing surfaces is substantially equal to the pressure exerted on the tip of the refill 2 by the user. When the refill tip is pressed against the working surface of a data tablet, the other end of the refill 2 presses against the inner surface of base 16 of refill interface plug 12. Radial end face 18 of base 16 in turn transmits the compressive force to the radial end face 21 of plunger 20, and the other radial end face 23 of plunger 20 in turn transmits the compressive force to the FSR transducer 26. Radial end face 58 of inner barrel plug 46, which is firmly held in place, provides a stable base against which the FSR transducer 26 and electrodes 24f, 24g can be pressed by movable plunger 20.

As best seen in FIG. 1, the cable assembly 60 is coupled to the body halves 66, 68 by means of two radially outwardly directed projections 92, 92' formed on the circumference of sleeve portion 94 of cable assembly 60. The projections 92, 92' respectively interlock with a pair of holes formed along the juncture of the assembled body halves 66, 68, each body half forming half of each hole. The holes, of course, have the same shape as the projections. The interlocking of projections 92, 92' and the aforementioned holes axially fixes the cable assembly 60 relative to the assembled body halves 66, 68. Each body half has a circumferential rib 96 formed on its inner bore surface. When the body halves 66 and 68 are assembled, the opposing ribs 96 (only one of which can be seen in FIG. 1) block leftward axially displacement of inner barrel assembly 64. Because the inner barrel assembly 64 cannot undergo leftward (as seen in FIG. 1) axial displacement, when movable plunger 20 (see FIG. 3) is leftward axially displaced in response to the stylus tip being pressed against a surface, the FSR transducer 26 and electrodes 24f, 24g are pressed between planar radial surfaces 23 and 58.

In what follows, the assembly of inner barrel 10, refill interface plug 12, plunger 20, and inner barrel plug 46 will be generally referred to as the inner barrel assembly 64.

The terminals 24d and 24e are soldered to the respective terminals 62, 62' of cable assembly 60. The sectional view of FIG. 4 shows the connection of terminal 62 to terminal 24e and the connection of terminal 62' to terminal 24d.

In addition, one end of a lead spacer tube 70, consisting of a cylindrical sleeve, is inserted into bore 50 of inner barrel plug 46. Bore 50 is slightly conical, enabling lead spacer tube 70 to be force-fit therein. Lead spacer tube 70 prevents coupled terminals 62–24d from coming into contact with coupled terminals 62'–24e.

The soldered subassembly comprising cable assembly 60 and inner barrel assembly 64 is arranged inside right and left body halves 66, 68. The flex board terminals 24d, 24e are aligned with the keying ribs 96 of body halves 66, 68 (see FIG. 4). As can be best seen in FIG. 4, left body half 68 has a pair of axial projections 72 and 72' which engage right body half 66. The body halves are ultrasonically bonded along this projection/body half interface, which ultrasonic bond contributes to the electrostatic discharge immunity of the stylus.

During assembly, O-rings 76 and 78 are installed in circumferential grooves formed on the outer periphery of body halves 66 and 68. The O-rings 76 and 78 hold the body halves together during ultrasonic bonding. The circumferential overlap of body halves 66, 68 in the area of the ultrasonically bonded junctures further contribute to the excellent immunity from external electromagnetic interference.

After body halves 66 and 68 have been bonded together, the self-sticking rubber washer 8 is installed into the recess provided in nose cone 6. The nose cone 6 is then bonded to the ultrasonically bonded body halves 66 and 68 using adhesive.

Outer barrel 80 is then slid onto ultrasonically bonded body halves 66 and 68 up to O-ring 76 near nose cone 6. Outer barrel 80 is bonded to bonded body halves 66 and 68 by adhesive applied along a circumference denoted by reference numeral 86.

Thereafter end cap 84 is respectively bonded to the other end of outer barrel 80 and to the strain relief portion of cable assembly 60.

The cable assembly 60 includes a coaxial cable. The shield of the coaxial cable is connected to terminal 24e of flex board 22, i.e. terminal 24e is connected to ground. The terminal 24d is connected to provide an analog signal by way of the coaxial cable to the digitizer electronics (not shown) for determining the level of dc bias. The level of dc bias between terminals 24d and 24e is changed by connecting the variable resistance of the FSR transducer therebetween.

The pressure-sensitive stylus according to the invention is used in connection with a charge ratio digitizer tablet. As disclosed in co-pending U.S. patent application Ser. No. 28,499 filed Mar. 20, 1987 which is assigned to the assignee of the present application, the stylus output signal can be sampled during a separate sampling cycle to determine the amplitude of a signal which is a function of the pressure being exerted on the stylus tip. In this sampling cycle the stylus is disabled in the sense that no current is capacitively induced in anode 24a of the stylus. Instead a voltage is applied across terminals 24d and 24e which produces a current in the circuit formed by terminal 24d, conductor 24c, electrode 24g, FSR transducer 26, electrode 24f, conductor 24h, and terminal 24e.

Figure 10:
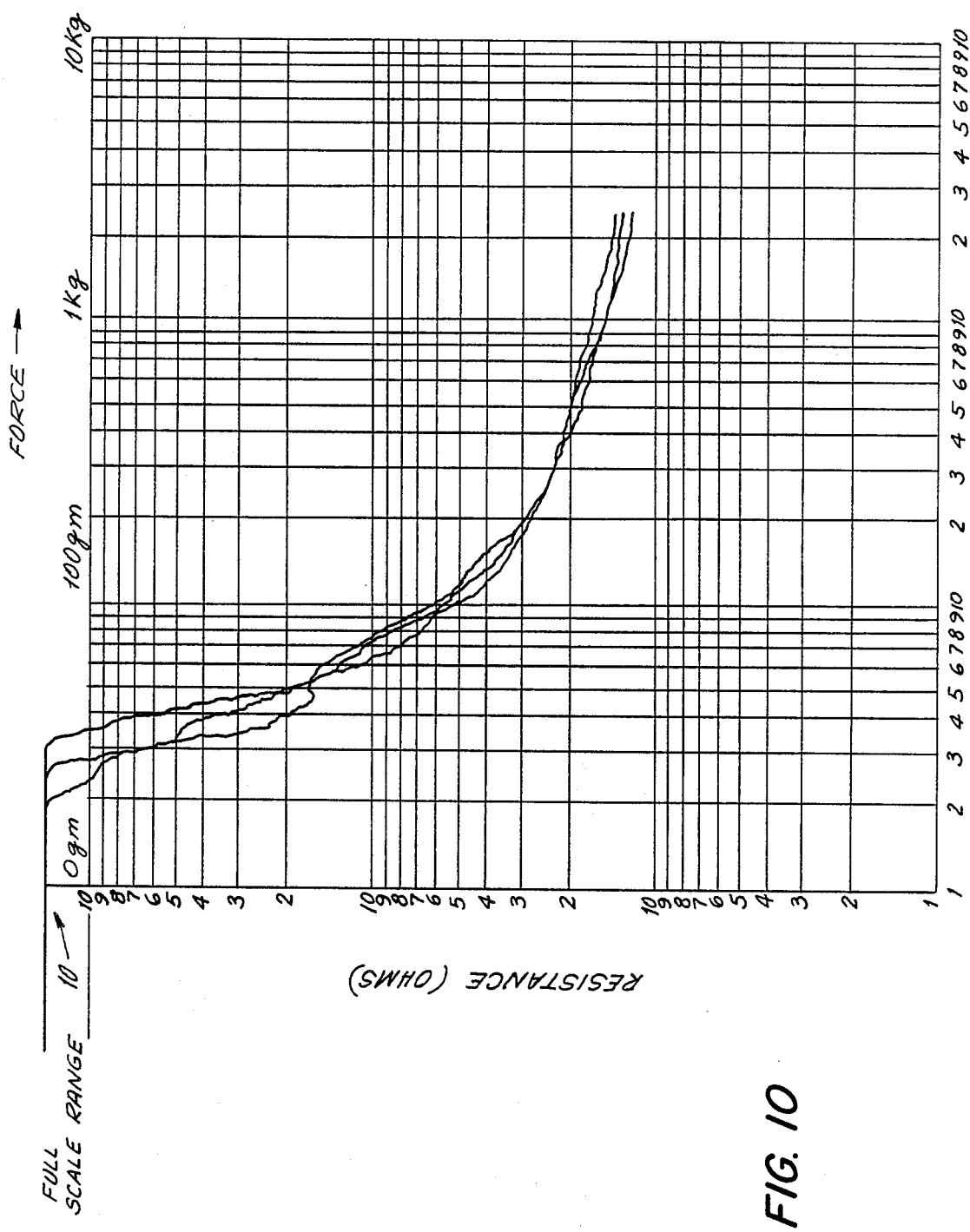
FIG. 10 is a graphical depiction of the measured variation of the resistance of the FSR transducer as a function of pressure for three different sample styluses.

The FSR transducer 26, which is folded to contact electrodes 24f and 24g, acts as a variable resistor. FSR transducer 26 is made of a force-sensing resistant (FSR) material, the resistance of which varies in dependence on the amount of compressive force being exerted in a direction substantially perpendicular to the plane of the transducer layer. The graph of the resistance of the FSR transducer as a function of the compressive force exerted thereon is shown in FIG. 10 for three sample styluses. As can be seen in FIG. 10, the resistance of FSR transducer 26 decreases as the magnitude of the compressive force increases. This variation in resistance of the FSR material produces a corresponding change in the dc level of the analog signal output at terminal 24d in response to the reference signal input at terminal 24e during the pressure sampling cycle by the electronic circuitry incorporated in the digitizer tablet.

The dc level of the analog signal can be detected using a comparator (not shown) incorporated in the digitizer electronics. The dc level of the analog signal is compared with a reference voltage supplied to the comparator. As the pressure on the stylus tip is increased, the resistance of the FSR transducer 26 decreases, whereby the dc level of the analog signal increases. When the dc level of the analog signal exceeds the reference voltage, the comparator output goes high. In response to the comparator output going high, a switch is closed which enables the flow of digitizing data from the stylus to the processing circuitry of the digitizer electronics during the electrode driving cycles. The digitizing data, corresponding to the signals induced in anode 24a by the driven electrode or electrodes of the charge ratio tablet during the driving cycles as disclosed in U.S. patent application Ser. No. 28,499 filed Mar. 20, 1987, are also output from the flexboard via terminal 24d, but at different times in the sampling cycle.

Thus, the FSR transducer 26 functions as a variable resistor, a switch in the digitizer electronics being closed in response to the variable resistance attaining a predetermined value. This predetermined resistance value should be attained at a pressure slightly less than the amount of pressure generally exerted on the tip of the pen refill when the stylus is used to write by a user. This feature makes it possible to digitize the handwriting of an individual, especially for signature verification purposes. The coordinates of the stylus tip relative to the digitizer tablet are determined only for those positions of the stylus tip at which the pressure of the tip against the tablet exceeds a predetermined pressure value, i.e. for those positions when the stylus is being used to write. This predetermined pressure value is the pressure at which the analog signal output from the stylus exceeds a stored predetermined analog value. In response to the stylus output signal surpassing the predetermined stored value, determination of the coordinates of the stylus tip will begin. Likewise when the pressure exerted by the stylus tip falls below the predetermined stored value, coordinate determination is halted.

Figure 11:
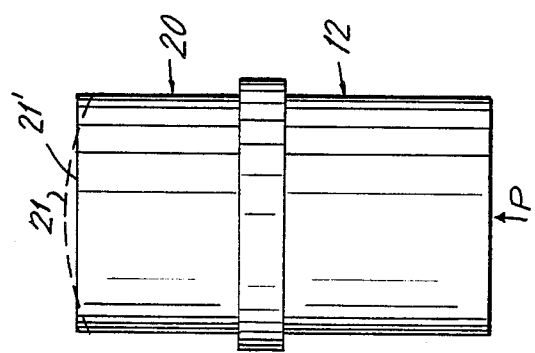
FIG. 11 is a side view of the refill interface plug and the rounded resilient plunger incorporated in a second preferred embodiment of the invention.

In the preferred embodiment described in connection with FIGS. 1–10, the FSR transducer is compressed between two substantially rigid planar radial surfaces. In another preferred embodiment (depicted in FIG. 11) the movable plunger 20 is made of resilient material and has a rounded surface 21 (denoted by the dashed line in FIG. 11) for compressing the FSR transducer. In the case of such a resilient rounded pressing surface, the area of contact of surface 21 with the portion of flex board 22 against which it is pressed increases as the pressure on the stylus tip increases. FIG. 11 shows the condition where rounded surface 21 elastically deforms to become a substantially planar surface 21' when applied against an opposing planar surface with sufficient pressure. In this case the resistance of the FSR transducer 26 is a function of the pressure on the stylus tip and the area of contact (i.e. the resilience of the plunger material).

Figure 12:
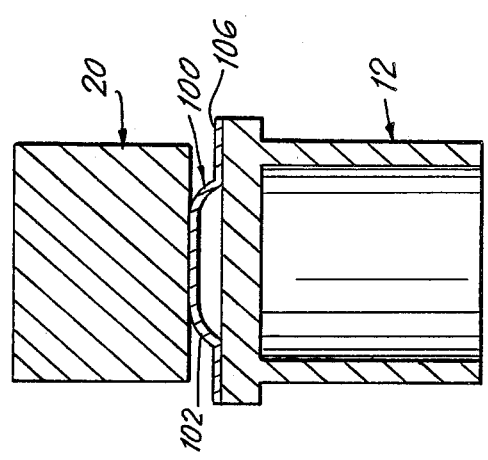
FIG. 12 is a longitudinal sectional view of the refill interface plug, membrane switch and plunger incorporated in a third preferred embodiment of the invention.

FIG. 12 indicates another embodiment of a pressure transducer in which a layer 100 of flexible material, for example, a thin sheet of silver or other metal, formed with a dome 102 is positioned between, for example, the refill interface plug 12 and the plunger 20. The dome 102 is surrounded by a planar annular portion 106 which is seated on the radial end face of refill interface plug 12. When a predetermined pressing force is applied to the dome by refill interface plug 12 and plunger 20, the dome undergoes reversible collapse. The metal dome is designed so that the collapse of the bubble takes place at a pressure which is substantially equal to the pressure at which the processing of data from the stylus is enabled, as previously described. The snap action during collapse of the dome can be sensed by the stylus user, providing a definite tactile feedback indicating to the user that the digitizing apparatus has switched from the disabled state to the enabled state. When pressure is removed from the stylus tip, the dome snaps back to its original undeformed state, ready for the next operation.

Figure 13:
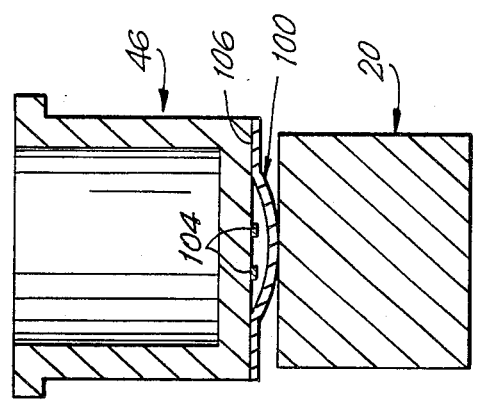
FIG. 13 is a longitudinal sectional view of the inner barrel plug, membrane switch and plunger incorporated in a fourth embodiment of the invention.

In FIG. 13, another embodiment of a pressure-sensitive transducer in accordance with the invention is shown. The transducer includes a pair of electrodes 104 which are, for example, respectively arranged on the planar radial surface 58 of inner barrel plug 46. These electrodes 104 may be formed as ink layers on a folded portion of a wrap-around flex board of the type already discussed. These electrodes 104 are electrically connected to respective terminals (not shown), which terminals are in turn respectively coupled to the terminals of a cable assembly. As in the embodiment of FIG. 12, a layer 100 of silver or other metal, comprising a dome 102 and an annular portion 106, is arranged such that the concave surface of the dome opposes the electrodes 104. When the movable plunger 20 moves toward the inner barrel plug 46, the dome 102 collapses and brings the dome of conductive silver or other conductive material into contact with electrodes 104, thereby bridging the gap between the electrodes 104 and completing an electrical path between the electrodes. When the pressure on the stylus tip is relieved, movable plunger 20 moves away from the inner barrel plug 46 and the collapsed dome 102 is resiliently restored to its original shape.

The foregoing description of the preferred embodiments is presented for illustrative purposes only and is not intended to limit the scope of the invention as defined in the appended claims. Modifications may be readily effected by one having ordinary skill in the art without departing from the spirit and scope of the invention concept herein disclosed.

What is claimed is:

1. A stylus for use with a digitizer tablet having a working surface, comprising:
   a conductive tip for pressing against the working surface of said digitizer tablet;
   a transducer having electrical resistance, said resistance varying with the amount of compressive force applied to said transducer;
   a pair of electrodes conductively contacting said transducer and in electrical circuit with said variable resistance when said compressive force is applied, said tip being electrically insulated from said electrodes;
   means for capacitively coupling said tip to one of said electrodes; and
   mechanical means for transmitting to said transducer a compressive force substantially equal to the pressure being exerted on the working surface of said tablet by said tip, whereby the resistance of said transducer is a function of said pressure.

2. The stylus as defined in claim 1, wherein said transducer includes a layer of conductive ink having a resistance which changes as a function of the compressive force applied thereon.

3. The stylus as defined in claim 2, wherein each of said electrodes includes a layer of conductive ink which is electrically connected to said transducer when said tip is pressed against the working surface of said digitizer tablet.

4. A stylus for use with a digitizer tablet having a working surface, comprising:
   a tip for pressing against the working surface of said digitizer tablet;
   a transducer having electrical resistance, said resistance varying with the amount of compressive force applied to said transducer;
   a pair of electrodes conductively contacting said transducer and in electrical circuit with said variable resistance when said compressive force is applied; and
   mechanical means for transmitting to said transducer a compressive force substantially equal to the pressure being exerted on the working surface of said tablet by said tip, whereby the resistance of said transducer is a function of said pressure, said transducer including a layer of conductive ink having a resistance which changes as a function of the compressive force applied thereon, each of said electrodes including a layer of conductive ink which is electrically connected to said transducer when said tip is pressed against the working surface of said digitizer tablet, said layer of conductive ink of said transducer being applied on a first plastic backing layer and said layer of conductive ink of said electrodes being applied on a second plastic backing layer, said first and second backing layers being non-conductive.

5. The stylus as defined in claim 4, wherein said backing layers are flexible.

6. The stylus as defined in claim 4, wherein said backing layers are made of Mylar.

7. The stylus as defined in claim 4, wherein said first and second backing layers are connected by a bridging portion, said first and second backing layers and said bridging portion being formed as a single layer of plastic, said single layer of plastic being folded at said bridging portion.

8. A stylus for use with a digitizer tablet having a working surface, comprising:
   a tip for pressing against the working surface of said digitizer tablet;
   a transducer having electrical resistance, said resistance varying with the amount of compressive force applied to said transducer;
   a pair of electrodes conductively contacting said transducer and in electrical circuit with said variable resistance when said compressive force is applied; and mechanical means for transmitting to said transducer a compressive force substantially equal to the pressure being exerted on the working surface of said tablet by said tip, whereby the resistance of said transducer is a function of said pressure, said transducer including a layer of conductive ink having a resistance which changes as a function of the compressive force applied thereon, each of said electrodes including a layer of conductive ink which is electrically connected to said transducer when said tip is pressed against the working surface of said digitizer tablet, said mechanical means for transmitting force being constructed to apply said compressive force to said ink layer of said transducer over an area which increases as said compressive force increases, the resistance of said ink layer of said transducer being dependent on both the magnitude of said compressive force and the area of said ink layer of said transducer to which said force is applied.

9. The stylus as defined in claim 8, wherein said mechanical means includes a part having a rounded end made of resilient material in contact with and transmitting said compressive force to said transducer in response to pressing of said tip against the working surface of said tablet, the area of contact of said rounded end increasing as said compressive force increases.

10. The stylus as defined in claim 1, further comprising a thin flexible material in the shape of a dome, said dome being subject to reversible collapse when pressure is applied on said dome, said dome being positioned between first and second parts of said mechanical means, said mechanical means transmitting said compressive force to said transducer by acting on and collapsing said dome.

11. The stylus as defined in claim 1, further comprising:
a sleeve-shaped casing having an axis; and
a support means substantially fixedly arranged relative to said casing and having a first planar surface substantially transverse to said axis of said casing,
wherein said mechanical means has a pressing means axially movable relative to said casing and having a second planar surface substantially transverse to said axis of said casing, said first and second planar surfaces being arranged in opposition, and said transducer and said electrodes being sandwiched between said first and second planar surfaces.

12. A stylus for use with a digitizer tablet having a working surface, comprising:
a conductive tip for pressing against the working surface of said digitizer tablet;
switch means electrically insulated from said tip for changing from a first state to a second state in response to a predetermined compressive force applied to said switch means, said switch means having first and second terminals;
means capacitively coupling one of said terminals to said tip; and
mechanical means for transmitting to said switch means a compressive force substantially equal to the pressure being exerted on the working surface of said digitizer tablet by said tip, whereby said switch state is changed in response to the pressure surpassing said predetermined compressive force.

13. A stylus as defined in claim 12, wherein said switch means includes a pair of electrical contacts and a conductive bridge, said mechanical means causing said conductive bridge to electrically connect said pair of contacts when said pressure force exceeds said predetermined compressive force.

14. A stylus as defined in claim 13, wherein said switch means includes a flexible plastic sheet, said pair of electrical contacts being applied on one surface of said sheet, said capacitive coupling means comprising an electrical layer on said sheet.

15. A stylus as defined in claim 14, wherein said conductive bridge comprises a thin layer of conductive material in the shape of a dome, said dome being subject to reversible collapse when said predetermined compressive force is applied on said dome, said dome being positioned between said mechanical means and said pair of electrical contacts, said mechanical means closing said switch by applying said predetermined compressive force to said dome.

16. A stylus for use with a digitizer tablet having a working surface and a first electrode, comprising:
a sleeve-shaped casing having an axis;
a conductive tip for pressing against the working surface of said digitizer tablet, said tip projecting from an end of said casing;
an anode capacitively coupled to said first electrode of said digitizer tablet via said tip;
a terminal electrically connected to said anode for outputting a signal produced during capacitive coupling of said anode; and
a thin substrate made of flexible material, and wrapped inside said casing, wherein said anode and said terminal are applied on said thin substrate.

17. A stylus for use with a digitizer tablet having a working surface and a first electrode, comprising:
a sleeve-shaped casing having an axis;
a tip for pressing against the working surface of said digitizer tablet, said tip projecting from an end of said casing;
an anode capable of being capacitively coupled to said first electrode of said digitizer tablet;
a terminal electrically connected to said anode for outputting a signal produced during capacitive coupling of said anode; and
a thin substrate made of flexible material, and wrapped inside said casing, wherein said anode and said terminal are applied on said thin substrate, said stylus further comprising:
a transducer having electrical resistance, said resistance varying with the magnitude of a compressive force applied to said transducer;
a pair of electrodes conductively contacting said transducer during application of said compressive force; and
mechanical means for transmitting to said transducer a compressive force substantially equal to the pressure being exerted on the working surface of said tablet by said, whereby the resistance of said transducer is a function of said pressure;
wherein said transducer and said pair of electrodes are respectively applied on said thin substrate.

18. The stylus as defined in claim 17, wherein said transducer includes a layer of conductive ink having a resistance which changes as a function of the compressive force applied thereon, and said electrodes each include a layer of conductive ink, said transducer being formed on a first portion of said substrate, said electrodes being formed on a second portion of said substrate, said anode being formed on a third portion of said substrate, said first and second portions being connected by a fourth portion of said substrate, said substrate being folded at said fourth portion.

19. The stylus as claimed in claim 17, further comprising a pen refill and an inner barrel in which said pen refill is arranged, the tip of said refill serving as said tip of said stylus and said mechanical means including a part of said pen refill, wherein said fourth portion of said substrate is wrapped around said inner barrel.

20. The stylus as defined in claim 17, further comprising a support means substantially fixedly arranged relative to said casing and having a first planar surface substantially transverse to said axis of said casing,
wherein said mechanical means has a pressing means axially movable relative to said casing and having a second planar surface substantially transverse to said axis of said casing, said first and second planar surfaces being arranged in opposition, and said transducer and said electrodes being sandwiched between said first and second planar surfaces.

* * * * *